(12) United States Patent
Shinke et al.

(10) Patent No.: US 11,505,623 B2
(45) Date of Patent: Nov. 22, 2022

(54) MODIFIED BUTADIENE POLYMER AND RUBBER COMPOSITION

(71) Applicant: THE YOKOHAMA RUBBER CO., LTD., Tokyo (JP)

(72) Inventors: Yu Shinke, Hiratsuka (JP); Kazuya Uenishi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 53 days.

(21) Appl. No.: 16/611,713

(22) PCT Filed: May 8, 2018

(86) PCT No.: PCT/JP2018/017731
§ 371 (c)(1),
(2) Date: Nov. 7, 2019

(87) PCT Pub. No.: WO2018/207762
PCT Pub. Date: Nov. 15, 2018

(65) Prior Publication Data
US 2020/0377624 A1 Dec. 3, 2020

(30) Foreign Application Priority Data
May 11, 2017 (JP) .............................. JP2017-094793

(51) Int. Cl.
*C08C 19/25* (2006.01)
*C08K 3/04* (2006.01)
*C08K 3/36* (2006.01)
*C08K 11/00* (2006.01)

(52) U.S. Cl.
CPC ................ *C08C 19/25* (2013.01); *C08K 3/04* (2013.01); *C08K 3/36* (2013.01); *C08K 11/005* (2013.01); *C08K 2201/006* (2013.01)

(58) Field of Classification Search
CPC .. C08G 19/25; C08K 3/04; C08K 3/36; C08C 19/25
See application file for complete search history.

(56) References Cited

U.S. PATENT DOCUMENTS

| | | | | |
|---|---|---|---|---|
| 5,232,987 A * | 8/1993 | Sakakibara | ............... | C08L 9/06 524/483 |
| 6,498,223 B2 * | 12/2002 | Sakata | ................... | C08F 220/44 524/555 |
| 6,562,929 B2 * | 5/2003 | Konno | ................... | C08F 236/12 526/338 |
| 7,064,171 B1 * | 6/2006 | Halasa | .................. | B60C 1/0016 152/209.1 |
| 10,273,351 B2 * | 4/2019 | Pavon Sierra | ........... | C08K 3/36 |
| 2015/0376321 A1 * | 12/2015 | Lee | ....................... | C08F 236/10 524/575 |
| 2018/0100058 A1 * | 4/2018 | Pavon Sierra | .......... | C08C 19/25 |
| 2018/0282446 A1 * | 10/2018 | Uenishi | ................... | C08F 36/06 |

FOREIGN PATENT DOCUMENTS

| | | | |
|---|---|---|---|
| DE | 102015210424 | * | 12/2016 |
| EP | 2 666 814 A1 | | 11/2013 |
| JP | 2009-287018 A | | 12/2009 |

* cited by examiner

*Primary Examiner* — Margaret G Moore
(74) *Attorney, Agent, or Firm* — Carrier Blackman & Associates P.C.

(57) ABSTRACT

The present invention provides a compounding agent which, when used in a rubber composition containing a reinforcing filler, exhibits excellent dispersibility, workability, toughness, low heat build-up, and wear resistance; and a rubber composition containing the compounding agent. A modified butadiene polymer of the present invention has a functional group containing a nitrogen atom and silicon atom at a terminal, a weight average molecular weight of the modified butadiene polymer being from 1000 to 15000, and a molecular weight distribution of the modified butadiene polymer being 2.0 or less.

12 Claims, No Drawings

MODIFIED BUTADIENE POLYMER AND RUBBER COMPOSITION

TECHNICAL FIELD

The present invention relates to a modified butadiene polymer and a rubber composition.

BACKGROUND ART

In general, reinforcing fillers such as carbon black or silica are compounded with rubber compositions used in tires and the like. Meanwhile, characteristics (for example, workability, toughness, low heat build-up, and wear resistance) may not be sufficiently obtained due to aggregation of the reinforcing fillers in the rubber composition caused by the interaction between the reinforcing fillers.

In such a situation, for example, Patent Document 1 discloses a modified low molecular weight conjugated diene polymer as a compounding agent for a rubber composition containing a reinforcing filler (claims etc.).

CITATION LIST

Patent Literature

Patent Document 1: JP 2009-287018A

SUMMARY OF INVENTION

Technical Problem

When the present inventors, referring to the example of Patent Document 1, examined using modified conjugated diene rubber as a compounding agent, the inventors discovered that the characteristics and the dispersibility of the reinforcing filler (hereinafter, "dispersibility of the reinforcing filler" is also simply referred to as "dispersibility") in the rubber composition obtained do not necessarily satisfy the level required currently.

In view of the circumstances described above, the object of the present invention is to provide: a compounding agent which, when used in a rubber composition containing a reinforcing filler, exhibits excellent dispersibility, workability, toughness, low heat build-up, and wear resistance; and a rubber composition containing the compounding agent.

Solution to Problem

As described above, from the results of the examination by the present inventors, it has been found that the dispersibility of the reinforcing filler is insufficient when the modified conjugated diene rubber used in the example of Patent Document 1 is used as a compounding agent. More specifically, it has been found that the dispersibility of the reinforcing filler is insufficient when a modified butadiene polymer (modified BR) having a weight average molecular weight of 80000 used in the example of Patent Document 1 is compounded with a rubber composition containing a reinforcing filler.

In such a situation, the present inventors, by examining with a focus on the size of the modified butadiene polymer, found significant correlation between the weight average molecular weight and the molecular weight distribution of the modified butadiene polymer and the dispersibility of the reinforcing filler. Furthermore, it was found that the dispersibility of the reinforcing filler is greatly improved by setting the weight average molecular weight and the molecular weight distribution within a specific range.

The present invention is based on the above knowledge, and the specific configuration is as follows.

(1) A modified butadiene polymer including a functional group containing a nitrogen atom and silicon atom at a terminal, the modified butadiene polymer having a weight average molecular weight of from 1000 to 15000, and a molecular weight distribution of 2.0 or less.

(2) The modified butadiene polymer according to (1), wherein a viscosity is from 150 to 240% relative to a viscosity of a butadiene polymer prior to modification, wherein the viscosity is measured with a cone-plate viscometer.

(3) The modified butadiene polymer according to (1) or (2) wherein the modified butadiene polymer is used in a rubber composition containing a rubber component having a weight average molecular weight greater than 15000 and a reinforcing filler containing at least one selected from the group consisting of carbon black and silica.

(4) A rubber composition including a rubber component having a weight average molecular weight greater than 15000, a reinforcing filler, and the modified butadiene polymer described in any one of (1) to (3), wherein a content of the reinforcing filler is from 50 to 200 parts by mass per 100 parts by mass of the rubber component, and a content of the modified butadiene polymer is from 1 to 25 mass % with respect to the content of the reinforcing filler.

(5) A rubber composition including a rubber component having a weight average molecular weight greater than 15000, a reinforcing filler containing at least one selected from the group consisting of carbon black and silica, and the modified butadiene polymer described in any one of (1) to (3).

(6) The rubber composition according to (4) or (5), wherein the reinforcing filler contains at least one selected from the group consisting of carbon black and silica, and the silica has a nitrogen adsorption specific surface area of 194 $m^2/g$ or greater, a CTAB adsorption specific surface area of 185 $m^2/g$ or greater, and a ratio of the nitrogen adsorption specific surface area to the CTAB adsorption specific surface area is from 0.9 to 1.4.

(7) The rubber composition according to (5) or (6), further including a silane coupling agent, wherein a content of the silane coupling agent is from 1 to 20 mass % with respect to the content of the silica.

(8) The rubber composition according to any one of (4) to (7), wherein a glass transition temperature of the rubber component is −60° C. or higher.

Advantageous Effects of Invention

As described below, a compounding agent which, when used in a rubber composition containing a reinforcing filler, exhibits excellent dispersibility, workability, toughness, low heat build-up, and wear resistance, and a rubber composition containing the compounding agent can be provided according to the present invention.

DESCRIPTION OF EMBODIMENTS

Hereinafter, a modified butadiene polymer that is the compounding agent of the present invention and a rubber composition containing the modified butadiene polymer will be described.

In the present specification, numerical ranges indicated using "(from) . . . to . . . " include the former number as the lower limit value and the latter number as the upper limit value.

Specific Modified BR

The modified butadiene polymer that is the compounding agent according to an embodiment of the present invention is a butadiene polymer having a functional group (hereafter also referred to as "specific functional group") containing a nitrogen atom and silicon atom at a terminal, the modified butadiene polymer having a weight average molecular weight of from 1000 to 15000, and a molecular weight distribution of 2.0 or less.

Hereinafter, the modified butadiene polymer that is the compounding agent according to an embodiment of the present invention is also referred to as "specific modified BR".

It is thought that, when the specific modified BR having such a configuration is used in a rubber composition containing a reinforcing filler, the reinforcing filler in the rubber composition exhibits excellent dispersibility.

The reason for this is not clear in detail, but it is thought that aggregation of the reinforcing filler is prevented by the interaction between the reinforcing filler and the nitrogen atoms and silicon atoms in the specific functional group of the specific modified BR. As described above, as a result of the examination by the present inventors, a criticality between the size (weight average molecular weight, molecular weight distribution) of the modified BR and the dispersibility of the reinforcing filler has been found. It is presumed that this is because when the size (weight average molecular weight, molecular weight distribution) of the modified BR is within the specific range described above, the modified BR can enter the gaps of the aggregates of the reinforcing filler easily, and the dispersibility of the reinforcing filler is greatly improved as a result.

Hereinafter, the specific modified BR will be described in detail.

As described above, the specific modified BR is a butadiene polymer (modified butadiene polymer) including a functional group (specific functional group) containing a nitrogen atom and silicon atom at a terminal, the butadiene polymer having a weight average molecular weight of from 1000 to 15000, and a molecular weight distribution of 2.0 or less.

Specific Functional Group

As described above, the specific modified BR has a functional group (specific functional group) containing a nitrogen atom and silicon atom at a terminal. Note that the specific modified BR may only have the specific functional group at at least one terminal.

Preferred Embodiment

The specific functional group is not particularly limited as long as it is a functional group containing a nitrogen atom and silicon atom, but from the perspective of optimizing the effect of the present invention, the nitrogen atom is preferably included as an amino group (—NR$_2$:R is a hydrogen atom or a hydrocarbon group), and the silicon atom is preferably included as a hydrocarbyloxysilyl group (≡SiOR: R is a hydrocarbon group).

From the perspective of optimizing the effect of the present invention, the specific functional group is preferably a group represented by Formula (M) below.

[Chemical Formula 1]

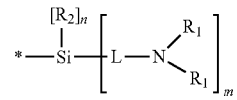

(M)

In Formula (M) above, R$_1$ to R$_2$ each independently represents a hydrogen atom or a substituent.

In Formula (M) above, L represents a divalent organic group.

The substituent is not particularly limited as long as the substituent is a monovalent substituent. Specific examples thereof include a halogen atom, hydroxy group, nitro group, carboxy group, alkoxy group, amino group, mercapto group, acyl group, imide group, phosphino group, phosphinyl group, silyl group, or hydrocarbon group which may have a hetero atom.

Examples of the halogen atom include a fluorine atom, chlorine atom, bromine atom, and iodine atom.

Examples of the hetero atom of the hydrocarbon group that may have a hetero atom include an oxygen atom, nitrogen atom, sulfur atom, and phosphorous atom.

Examples of the hydrocarbon group that may have a hetero atom include an aliphatic hydrocarbon group, aromatic hydrocarbon group, and group that is a combination of these.

The aliphatic hydrocarbon group may be in a form of straight-chain, branched-chain, or ring. Specific examples of the aliphatic hydrocarbon group include a straight-chain or branched alkyl group (especially, those having from 1 to 30 carbons), straight-chain or branched alkenyl group (especially, those having from 2 to 30 carbons), and straight-chain or branched alkynyl group (especially, those having from 2 to 30 carbons).

Examples of the aromatic hydrocarbon group include an aromatic hydrocarbon group having from 6 to 18 carbons, such as a phenyl group, a tolyl group, a xylyl group, and a naphthyl group.

In Formula (M) above, R$_1$ is preferably a hydrogen atom, an alkyl group (preferably having from 1 to 10 carbons), an alkylsilyl group (preferably having from 1 to 10 carbons), and an aromatic hydrocarbon group (preferably having from 6 to 18 carbons), and more preferably a hydrogen atom, from the perspective of optimizing the effect of the present invention.

The plurality of R$_1$ may be the same or different.

From the perspective of optimizing the effect of the present invention, R$_2$ is preferably a hydrocarbyloxy group (—OR group: R is a hydrocarbon group), and is more preferably an alkoxy group (preferably having from 1 to 10 carbons).

As described above, in Formula (M) above, L represents a single bond or a divalent organic group.

Examples of the divalent organic group include an aliphatic hydrocarbon group (e.g. an alkylene group, preferably having from 1 to 10 carbons), aromatic hydrocarbon group (e.g. an arylene group, preferably having from 6 to 18 carbons), —O—, —S—, —SO$_2$—, (R: alkyl group), —CO—, —NH—, —COO—, —CONH—, and a group having a combination of these (e.g. an alkyleneoxy group (~CmH$_2$mO—: m is a positive integer), alkyleneoxycarbonyl group, and alkylenecarbonyloxy group).

From the perspective of optimizing the effect of the present invention, L is preferably an alkylene group (preferably having from 1 to 10 carbons).

In Formula (M) above, n is an integer of 0 to 2.

From the perspective of optimizing the effect of the present invention, n is preferably 2.

In Formula (M) above, m is an integer of 1 to 3.

From the perspective of optimizing the effect of the present invention, m is preferably 1.

In Formula (M) above, n and m satisfy a relationship equation of n+m=3.

In Formula (M) above, * indicates a bond position.

Weight Average Molecular Weight

As described above, the weight average molecular weight (Mw) of the specific modified BR is from 1000 to 15000. Among these, it is preferably from 5000 and above to less than 10000, from the perspective of optimizing the effect of the present invention.

Number Average Molecular Weight

The number average molecular weight of the specific modified BR is not particularly limited as long as the weight average molecular weight and the molecular weight distribution of the specific modified BR are within a specific range; meanwhile, from the perspective of optimizing the effect of the present invention, the number average molecular weight of the specific modified BR is preferably from 1000 to 15000, and more preferably from 5000 and above to less than 10000.

Molecular Weight Distribution

As described above, the molecular weight distribution (Mw/Mn) of the specific modified BR is 2.0 or less. Among these, 1.7 or less is preferable, 1.5 or less is more preferable, and 1.3 or less is further preferable, from the perspective of optimizing the effect of the present invention.

The lower limit is not particularly limited, but is usually 1.0 or greater.

Note that in the present specification, the weight average molecular weight (Mw) and number average molecular weight (Mn) are obtained by gel permeation chromatography (GPC) measurement, calibrated with polystyrene standard, under the following conditions.

Solvent: Tetrahydrofuran

Detector: RI detector

Microstructure

Vinyl Structure

In the specific modified BR, a proportion of vinyl structure is not particularly limited, but is preferably from 10 to 50 mol %, and more preferably from 20 to 40 mol %, from the perspective of optimizing the effect of the present invention.

Here, the proportion of vinyl structure refers to the proportion (mol %) of the repeating units having a vinyl structure to the repeating units derived from butadiene.

1,4-trans Structure

In the specific modified BR, a proportion of 1,4-trans structure is not particularly limited, but is preferably from 10 to 70 mol %, and more preferably from 30 to 50 mol %, from the perspective of optimizing the effect of the present invention.

Here, the proportion of 1,4-trans structure refers to the proportion (mol %) of the repeating units having a 1,4-trans structure to the repeating units derived from butadiene.

1,4-cis Structure

In the specific modified BR, a proportion of 1,4-cis structure is not particularly limited, but is preferably from 10 to 50 mol %, and more preferably from 20 to 40 mol %, from the perspective of optimizing the effect of the present invention.

Here, the proportion of 1,4-cis structure refers to the proportion (mol %) of the repeating units having a 1,4-cis structure to the repeating units derived from butadiene.

Note that hereinafter, "proportion of vinyl structure (mol %), proportion of 1,4-trans structure (mol %), proportion of 1,4-cis structure (mol %)" is also expressed as "vinyl/trans/cis".

Glass Transition Temperature

A glass transition temperature (Tg) of the specific modified BR is not particularly limited, but is preferably −100° C. to −60° C., more preferably −90° C. to −70° C., and further preferably −85° C. to −75° C., from the perspective of optimizing the effect of the present invention.

Note that in the present specification, the glass transition temperature (Tg) is measured using a differential scanning calorimeter (DSC) at a rate of temperature increase of 10° C./minutes and calculated using the midpoint method.

Viscosity

A viscosity of the specific modified BR is not particularly limited, but is preferably 1000 to 10000 Pa·s, more preferably 3000 to 6000 Pa·s, from the perspective of optimizing the effect of the present invention.

In addition, the viscosity of the butadiene polymer prior to modifying the specific modified BR is not particularly limited, but is preferably 500 to 5000 mPa·s, and more preferably 1500 to 3000 mPa·s, from the perspective of optimizing the effect of the present invention.

Furthermore, the viscosity of the specific modified BR is preferably 150% to 240% with respect to the viscosity of the butadiene polymer prior to modification, from the perspective of optimizing the effect of the present invention. Hereinafter, the viscosity of the specific modified BR after modification with respect to the viscosity of the specific modified BR prior to modification is also referred to as "viscosity (after modification/before modification)".

Note that in the present specification, viscosity is measured using a cone-plate viscometer according to JIS K5600-2-3.

Method of Producing Specific Modified BR

A method of producing the specific modified BR is not particularly limited, and known methods can be used. The method for bringing the molecular weight and molecular weight distribution within the specific range is not particularly limited, and examples thereof include a method of adjusting a quantitative ratio of an initiator to the monomer and a terminator, a reaction temperature, and a rate at which the initiator is added.

Preferred Embodiment

Preferred embodiment of the method of producing the specific modified BR include, for example, a method (hereinafter also referred to as "method of the present invention") of polymerizing butadiene with an organolithium compound, and then terminating the polymerization using an electrophile containing a nitrogen atom and silicon atom. When the method of the present invention is used, the specific modified BR obtained exhibits excellent dispersibility, workability, toughness, low heat build-up, and wear resistance when used in a rubber composition containing a reinforcing filler.

Organolithium Compound

The organolithium compound is not particularly limited, and specific examples thereof include: mono-organolithium compounds such as n-butyllithium, sec-butyllithium, tert-butyllithium, n-propyllithium, iso-propyllithium, benzyl-lithium, and the like; polyfunctional organolithium compounds such as 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene, 1,2-dilithio-1,2-diphenylethane, 1,4-dilithio-2-ethylcyclohexane, 1,3,5-trilithiobenzene, and 1,3,5-trilithio-2,4,6-triethylbenzene. Among these, mono-organolithium compounds such as n-butyllithium, sec-butyllithium, and tert-butyllithium are preferable, from the perspective of optimizing the effect of the present invention.

The amount of the organolithium compound used is not particularly limited, but is preferably 0.001 to 10 mol % relative to butadiene, from the perspective of optimizing the effect of the present invention.

Copolymerization of Butadiene

The method of polymerizing butadiene using an organolithium compound is not particularly limited, and examples thereof include a method of adding the organolithium compound described above to an organic solvent solution containing butadiene and agitating at a temperature range of 0° C. to 120° C. (preferably 30° C. to 100° C.).

Specific Electrophile

In the method of the present invention, the polymerization of butadiene is terminated using an electrophile (hereinafter also referred to as "specific electrophile") containing a nitrogen atom and silicon atom. The modified butadiene polymer having the specific functional group at a terminal thereof as described above is obtained by terminating the polymerization using a specific electrophile.

The specific electrophile is not particularly limited as long as it is a compound containing a nitrogen atom and silicon atom, but is preferably one containing an amino group (—NR$_2$: R is a hydrogen atom or a hydrocarbon group) as the nitrogen atom, and a hydrocarbyloxysilyl group (≡SiOR: R is a hydrocarbon group) as the silicon atom, from the perspective of optimizing the effect of the present invention.

The specific electrophile is preferably a silazane, more preferably a cyclic silazane, from the perspective of optimizing the effect of the present invention. Here, "silazane" means a compound having a structure in which a silicon atom and a nitrogen atom are directly bonded (compound having a Si—N bond).

From the perspective of optimizing the effect of the present invention, the cyclic silazane is preferably a compound represented by Formula (S) below.

[Chemical Formula 2]

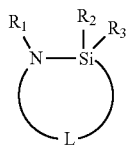

(S)

In Formula (S) above, R$_1$ to R$_3$ each independently represent a hydrogen atom or a substituent. Specific examples and preferred forms of the substituent are identical to that of R$_1$ and R$_2$ in Formula (M) above.

In Formula (S) above, L represents a divalent organic group. Specific examples and preferred forms of the divalent organic group are identical to L in Formula (M) above.

In Formula (S) above, R$_1$ is preferably an alkyl group (preferably having from 1 to 10 carbons), an alkylsilyl group (preferably having from 1 to 10 carbons), and an aromatic hydrocarbon group (preferably having from 6 to 18 carbons), more preferably an alkylsilyl group, from the perspective of optimizing the effect of the present invention.

In Formula (S) above, R$_2$ and R$_3$ are preferably each independently a hydrocarbyloxy group (—OR group: R is a hydrocarbon group), more preferably an alkoxy group (preferably having from 1 to 10 carbons), from the perspective of optimizing the effect of the present invention.

In Formula (S) above, L is preferably an alkylene group (preferably having from 1 to 10 carbons, more preferably from 2 to 8 carbons, further preferably from 3 to 5 carbons), from the perspective of optimizing the effect of the present invention.

Examples of the compound represented by Formula (S) include N-n-butyl-1,1-dimethoxy-2-azasilacyclopentane, N-phenyl-1,1-dimethoxy-2-azasilacyclopentane, N-trimethylsilyl-1,1-dimethoxy-2-azasilacyclopentane, and N-trimethylsilyl-1,1-diethoxy-2-azasilacyclopentane.

Note that the silicon atoms of the cyclic silazane are considered to exhibit electrophilicity.

The amount of the specific electrophile relative to the organolithium compound is not particularly limited, but the molar ratio is preferably 0.1 to 10, more preferably 1 to 5, from the perspective of optimizing the effect of the present invention.

Rubber Composition

The rubber composition according to an embodiment of the present invention (hereinafter also referred to as "composition of the present invention") is a rubber composition containing a rubber component having a weight average molecular weight of greater than 15000, a reinforcing filler, and the specific modified BR described above.

Rubber Component

The rubber component is not particularly limited as long as the weight average molecular weight (Mw) is greater than 15000.

From the perspective of optimizing the effect of the present invention, the rubber component is preferably a diene rubber. Examples of the diene rubber include a natural rubber (NR), isoprene rubber (IR), butadiene rubber (BR), styrene-butadiene rubber (SBR), acrylonitrile-butadiene copolymer rubber (NBR), butyl rubber (IIR), halogenated butyl rubber (Br-IIR, Cl-IIR), and chloroprene rubber (CR). Among these, SBR and BR are preferable, from the perspective of optimizing the effect of the present invention.

A content (styrene unit content) of an SBR styrene unit (repeating unit derived from styrene) is not particularly limited, but is preferably 5 to 50 mass %, from the perspective of optimizing the effect of the present invention.

In addition, a proportion of a vinyl structure in the SBR is not particularly limited, but is preferably 5 to 80%, more preferably 10 to 75%, further preferably 20 to 70%, from the perspective of optimizing the effect of the present invention. Here, the proportion of vinyl structure refers to the proportion (mol %) of the repeating units having a vinyl structure to the repeating units derived from butadiene.

Weight Average Molecular Weight

As described above, the weight average molecular weight (Mw) of the rubber component is greater than 15000. The Mw of the rubber component is preferably from 100000 to 10000000, from the perspective of optimizing the effect of the present invention.

The measurement method of the weight average molecular weight is as described above.

Glass Transition Temperature

A glass transition temperature (Tg) of the rubber component is not particularly limited, but is preferably −60° C. or higher, from the perspective of optimizing the effect of the present invention. The upper limit is not particularly limited, but is preferably 0° C. or lower, more preferably −20° C. or lower, from the perspective of optimizing the effect of the present invention. The measurement method of Tg is as described above.

Note that when the rubber component is an oil-extended product, the glass transition temperature of the rubber component is the glass transition temperature in a state in which an oil-extended component (oil) is not included. Additionally, when the rubber component contains two or more types of rubber components, the glass transition temperature of the rubber component is an average glass transition temperature. Here, the average glass transition temperature is a total obtained by multiplying the glass transition temperature of each rubber component by the mass fraction of each rubber component (weighted average value of glass transition temperature), and the total mass fraction of all rubber components is 1.

Reinforcing Filler

The reinforcing filler included in the composition according to an embodiment of the present invention is not particularly limited, but is preferably at least one type selected from the group consisting of silica and carbon black.

In the composition according to an embodiment of the present invention, a content of the reinforcing filler is not particularly limited; however, from the perspective of optimizing the effect of the present invention, the content is preferably 50 to 200 parts by mass, more preferably 60 to 100 parts by mass per 100 parts by mass of the rubber component described above.

Note that the content of the reinforcing filler refers to the total content when the composition of the present invention contains two or more reinforcing fillers.

Silica

The composition according to an embodiment of the present invention preferably contains silica as a reinforcing filler from the perspective of optimizing the effect of the present invention.

The silica is not particularly limited, and any known silica can be used.

Examples of the silica include wet silica, dry silica, fumed silica, and diatomaceous earth. One type of the silica may be used alone, or two or more types of the silicas may be used in combination.

A cetyltrimethylammonium bromide (CTAB) adsorption specific surface area (hereinafter, "CTAB adsorption specific surface area" is also simply referred to as "CTAB") of the silica is not particularly limited, but is preferably from 100 to 300 $m^2/g$, more preferably 185 $m^2/g$ or greater, from the perspective of optimizing the effect of the present invention.

Here, the CTAB adsorption specific surface area is an amount of the CTAB adsorption on the silica surface measured in accordance with JIS K6217-3:2001 (Part 3: Method for determining specific surface area—CTAB adsorption method).

A nitrogen adsorption specific surface area ($N_2SA$) of the silica is not particularly limited, but is preferably from 100 to 300 $m^2/g$, more preferably 194 $m^2/g$ or greater, from the perspective of optimizing the effect of the present invention.

Here, $N_2SA$ is a measure of the surface area characteristics, which can be used as an alternative to adsorption of the rubber molecules by the silica, and is an amount of the nitrogen adsorption on the silica surface measured in accordance with JIS K6217-2:2001 (Part 2: Determination of specific surface area—Nitrogen adsorption methods—Single-point procedures).

The ratio of the silica nitrogen adsorption specific surface area to the CTAB adsorption specific surface area of the silica ($N_2SA$/CTAB) is not particularly limited, but is preferably 0.9 to 1.4 from the perspective of optimizing the effect of the present invention.

In the composition according to an embodiment of the present invention, the silica content is not particularly limited, but is preferably from 10 to 150 mass %, more preferably from 50 to 100 mass %, per 100 parts by mass of the rubber component described above, from the perspective of optimizing the effect of the present invention.

Carbon Black

The composition according to an embodiment of the present invention preferably contains carbon black as a reinforcing filler from the perspective of optimizing the effect of the present invention. One type of the carbon black may be used alone, or two or more types of the carbon black may be used in combination.

The carbon black is not particularly limited. Carbon blacks of various grades, such as SAF-HS, SAF, ISAF-HS, ISAF, ISAF-LS, IISAF-HS, HAF-HS, HAF, HAF-LS, FEF, GPF, and SRF, can be used.

The nitrogen adsorption specific surface area ($N_2SA$) of the carbon black is not particularly limited, but is preferably from 50 to 200 $m^2/g$, and more preferably from 70 to 150 $m^2/g$, from the perspective of optimizing the effect of the present invention.

Here, the nitrogen adsorption specific surface area ($N_2SA$) is an amount of nitrogen adsorption on the surface of carbon black measured in accordance with JIS K6217-2: 2001 (Part 2: Determination of specific surface area—Nitrogen adsorption methods—Single-point procedures).

In the composition according to an embodiment of the present invention, the content of carbon black is not particularly limited, but is preferably from 1 to 100 mass %, more preferably from 2 to 10 mass %, per 100 parts by mass of the rubber component described above, from the perspective of optimizing the effect of the present invention.

Specific Modified BR

As described above, the composition according to an embodiment of the present invention contains the above-described specific modified BR.

In the composition of the present invention, a content of the modified BR is not particularly limited, but is preferably from 1 to 25 mass %, more preferably from 2.0 to 10.0 mass %, relative to the content of the reinforcing filler described above, from the perspective of optimizing the effect of the present invention.

Furthermore, the content of the specific modified BR is preferably from 1 parts by mass to less than 10 parts by mass per 100 parts by mass of the rubber component described above, from the perspective of optimizing the effect of the present invention.

Silane Coupling Agent

The composition according to an embodiment of the present invention preferably contains a silane coupling agent from the perspective of optimizing the effect of the present invention. One type of the silane coupling agent may be used alone, or two or more types may be used in combination.

The silane coupling agent is not particularly limited as long as it is a silane compound having a hydrolyzable group and an organic functional group.

The hydrolyzable group is not particularly limited; however, examples thereof include an alkoxy group, phenoxy group, carboxyl group, and alkenyloxy group. Among these, the alkoxy group are preferable. When the hydrolyzable group is an alkoxy group, the number of carbon atoms of the alkoxy group is preferably from 1 to 16, and more preferably from 1 to 4. Examples of the alkoxy group having from 1 to 4 carbons include a methoxy group, ethoxy group, and propoxy group.

The organic functional group is not particularly limited, but is preferably a group capable of forming a chemical bond with an organic compound. Examples thereof include an epoxy group, vinyl group, acryloyl group, methacryloyl group, amino group, sulfide group, and mercapto group; among these, the sulfide group and mercapto group are preferable.

The silane coupling agent is preferably a sulfur-containing silane coupling agent.

Examples of the silane coupling agent are bis(3-triethoxysilylpropyl)tetrasulfide, bis(3-trimethoxysilylpropyl)tetrasulfide, bis(3-triethoxysilylpropyl)disulfide, mercaptopropyltrimethoxysilane, mercaptopropyltriethoxysilane, 3-trimethoxysilylpropyl-N,N-dimethylthiocarbamoyl-tetrasulfide, trimethoxysilylpropyl-mercaptobenzothiazole tetrasulfide, triethoxysilylpropyl-methacrylate-monosulfide, and dimethoxymethylsilylpropyl-N,N-dimethylthiocarbamoyl-tetrasulfide; one of these can be used alone, or a combination of two or more can be used.

In the composition according to an embodiment of the present invention, a content of the silane coupling agent is not particularly limited, but is preferably from 1 to 20 mass %, more preferably from 5 to 10 mass %, relative to the silica content described above, from the perspective of optimizing the effect of the present invention.

Other Components

The composition according to an embodiment of the present invention may further contain components (other components) besides the components described above, within the scope which does not impair the effect or purpose thereof, as needed.

Examples of such components include various additives that are typically used in rubber compositions, such as a terpene resin (preferably an aromatic modified terpene resin), thermal expanding microcapsule, zinc oxide (flower of zinc), stearic acid, anti-aging agent, wax, processing aid, oil, liquid polymer, thermosetting resin, vulcanizing agent (for example, sulfur), and vulcanization accelerator.

Use

The composition according to an embodiment of the present invention is suitably used for a tires, conveyor belt, hose, vibration-proof material, rubber roll, exterior hood of a railway vehicle, and the like. Among these, the composition according to an embodiment of the present invention is suitably used for a tire.

Example

The present invention is described in further detail below by using examples. However, the present invention is not limited to these examples.

Synthesis Example

Comparative modified BR1 to 2 and specific modified BR1 to 4 were synthesized as follows.

Here, each of the specific modified BR1 to BR4 is a modified BR that has a functional group, which is represented by Formula (m1) below and corresponds to the specific functional group, at a terminal, has a Mw that is from 1000 to 15000, and has a Mw/Mn that is 2.0 or less; therefore, the specific modified BR1 to BR4 corresponds to the "specific modified BR" described above. By contrast, while having a functional group, represented by Formula (m1) below, at a terminal and a Mw/Mn that is 2.0 or less, the comparative modified BR1 does not correspond to the "specific modified BR" described above because the Mw thereof is over 15000. In addition, while having a functional group, represented by Formula (m1) below, at a terminal and a Mw that is from 1000 to 15000, the comparative modified BR2 does not correspond to the "specific modified BR" described above because the Mw/Mn thereof is over 2.0.

Comparative Modified BR1

To a cyclohexane (3.0 kg) solution of a mixture of 1,3-butadiene (230 g, 4259 mmol) and 2,2-di(2-tetrahydrofuryl)propane (available from Tokyo Chemical Industry Co., Ltd.; 0.1 mL, 0.55 mmol), n-BuLi(n-butyllithium) (available from Kanto Chemical Co., Ltd.; 1.60 mol/L (hexane solution), 21 mL, 33.6 mmol) was added and agitated at room temperature for 6 hours. After the reaction, N-trimethylsilyl-1,1-dimethoxy-2-azasilacyclopentane(structure below) (15 g, 68.5 mmol) was fed to terminate the polymerization.

[Chemical Formula 3]

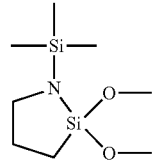

The resulting solution was taken out and concentrated under reduced pressure. The concentrated solution was poured into methanol (5.0 L) to separate methanol insoluble components. As a result, a modified BR (comparative modified BR1) (212 g, Mn=17400, Mw=19200, Mw/Mn=1.1) having a functional group, represented by Formula (m1) below (here, * represents a bonding position), at a terminal was obtained with a yield of 92%. Note that it was estimated by IR analysis that cis/trans/vinyl=21/33/46. Additionally, Tg was −70° C.

[Chemical Formula 4]

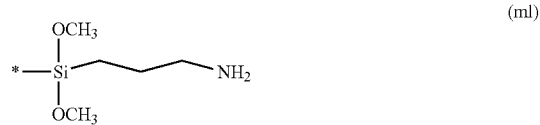

(m1)

Comparative Modified BR2

To a cyclohexane (4.20 kg) solution of a mixture of 1,3-butadiene (461 g, 8518 mmol) and 2,2-di(2-tetrahydrofuryl)propane (available from Tokyo Chemical Industry Co., Ltd.; 0.2 mL, 1.09 mmol), n-BuLi (available from Kanto Chemical Co., Ltd.; 1.60 mol/L (hexane solution), 23.2 mL, 37.2 mmol) was added and agitated at room temperature. Every 1 hour and 30 minutes, 23.2 mL of n-BuLi, 92.8 mL in total, was added; 6 hours after the reaction was initiated, N-trimethylsilyl-1,1-dimethoxy-2-azasilacyclopentane (60 g, 274 mmol) was fed to terminate the polymerization. The resulting solution was taken out and concentrated under reduced pressure. The concentrated solution was poured into methanol (10 L) to separate methanol insoluble components. As a result, a modified BR (comparative modified BR2) (740 g, Mn=4000, Mw=8800, Mw/Mn=2.2) having a functional group, represented by Formula (m1) above, at a terminal thereof was obtained with a yield of 97%. Note that it was estimated by IR analysis that cis/trans/vinyl=23/38/39. Additionally, Tg was −77° C.

Specific Modified BR1

To a cyclohexane (2.96 kg) solution of a mixture of 1,3-butadiene (198 g, 3667 mmol) and 2,2-di(2-tetrahydrofuryl)propane (available from Tokyo Chemical Industry Co., Ltd.; 0.1 mL, 0.55 mmol), n-BuLi (available from Kanto Chemical Co., Ltd.; 1.60 mol/L (hexane solution), 50 mL, 80 mmol) was added and agitated at room temperature for 6 hours. After the reaction, N-trimethylsilyl-1,1-dimethoxy-2-azasilacyclopentane (30 g, 137 mmol) was fed to terminate the polymerization. The resulting solution was taken out and concentrated under reduced pressure. The concentrated solution was poured into methanol (5.0 L) to separate methanol insoluble components. As a result, a modified BR (specific modified BR1) (182 g, Mn=4100, Mw=4400, Mw/Mn=1.1) having a functional group, represented by Formula (m1) above, at a terminal was obtained with a yield of 92%. Note that it was estimated by IR analysis that cis/trans/vinyl=31/45/24. Additionally, Tg was −83° C. Further, the viscosity (after modification/before modification) was 196%.

Specific Modified BR2

To a cyclohexane (2.96 kg) solution of a mixture of 1,3-butadiene (205 g, 3786 mmol) and 2,2-di(2-tetrahydrofuryl)propane (available from Tokyo Chemical Industry Co., Ltd.; 0.1 mL, 0.55 mmol), n-BuLi (available from Kanto Chemical Co., Ltd.; 1.60 mol/L (hexane solution), 27 mL, 43.2 mmol) was added and agitated at room temperature for 6 hours. After the reaction, N-trimethylsilyl-1,1-dimethoxy-2-azasilacyclopentane (15 g, 137 mmol) was fed to terminate the polymerization. The resulting solution was taken out and concentrated under reduced pressure. The concentrated solution was poured into methanol (10 L) to separate methanol insoluble components. As a result, a modified BR (specific modified BR2) (199 g, Mn=7600, Mw=8100, Mw/Mn=1.1) having a functional group, represented by Formula (m1) above, at a terminal thereof was obtained with a yield of 97%. Note that it was estimated by IR analysis that cis/trans/vinyl=24/40/36. Additionally, Tg was −80° C. Further, the viscosity (after modification/before modification) was 204%.

Specific Modified BR3

To a cyclohexane (3.5 kg) solution of a mixture of 1,3-butadiene (256 g, 4732 mmol) and 2,2-di(2-tetrahydrofuryl)propane (available from Tokyo Chemical Industry Co., Ltd.; 0.1 mL, 0.55 mmol), n-BuLi (available from Kanto Chemical Co., Ltd.; 1.60 mol/L (hexane solution), 17 mL, 27.2 mmol) was added and agitated at room temperature for 3 hours. Thereafter, 17 mL of N-BuLi was added and agitated for 3 hours. After the reaction, N-trimethylsilyl-1,1-dimethoxy-2-azasilacyclopentane (25 g, 114 mmol) was fed to terminate the polymerization. The resulting solution was taken out and concentrated under reduced pressure. The concentrated solution was poured into methanol (5.0 L) to separate methanol insoluble components. As a result, a modified BR (specific modified BR3) (740 g, Mn=6300, Mw=9400, Mw/Mn=1.5) having a functional group, represented by Formula (m1) above, at a terminal thereof was obtained with a yield of 95%. Note that it was estimated by IR analysis that cis/trans/vinyl=24/38/38. Additionally, Tg was −76° C. Further, the viscosity (after modification/before modification) was 181%.

Specific Modified BR4

To a cyclohexane (4.15 kg) solution of a mixture of 1,3-butadiene (762 g, 14078 mmol) and 2,2-di(2-tetrahydrofuryl)propane (available from Tokyo Chemical Industry Co., Ltd.; 0.25 mL, 1.36 mmol), n-BuLi (available from Kanto Chemical Co., Ltd.; 1.60 mol/L (hexane solution), 92 mL, 147.2 mmol) was added and agitated at room temperature for 6 hours. After the reaction, 1,1,1-trimethyl-N-[3-(trimethoxysilyl)propyl]-N-(trimethylsilyl)silanamine (structure below) (59 g, 185 mmol) was fed to terminate the polymerization.

[Chemical Formula 5]

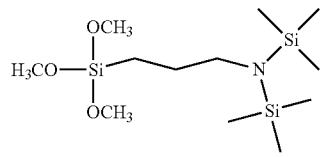

The resulting solution was taken out and concentrated under reduced pressure. The concentrated solution was poured into methanol (10 L) to separate methanol insoluble components. As a result, a modified BR (specific modified BR4) (740 g, Mn=8000, Mw=9500, Mw/Mn=1.2) having a functional group, represented by Formula (m1) above, at a terminal was obtained with a yield of 97%. Note that it was estimated by IR analysis that cis/trans/vinyl=26/45/29. Additionally, Tg was −82° C. Further, the viscosity (after modification/before modification) was 163%.

Preparation of Rubber Composition

The components shown in Tables 1 below were compounded in the proportions (parts by mass) shown in the same table.

Specifically, the components shown in Table 1 below except for the sulfur and the vulcanization accelerator were first mixed in a Bunbury mixer at a temperature of 80° C. for 5 minutes. Thereafter, the sulfur and the vulcanization accelerator were mixed into the mixture using a roll to obtain a rubber composition.

Note that regarding the values of SBR in Table 1, the values of the top row are the amounts (unit: parts by mass) of SBR (oil extended product), while the values of the bottom row are the net amounts (unit: parts by mass) of SBR included in SBR.

Evaluation

The rubber compositions obtained was evaluated as below.

Dispersibility

A vulcanized rubber sheet was prepared by press-vulcanizing each of the obtained (unvulcanized) rubber compositions for 15 minutes at 160° C. in a mold (15 cm×15 cm×0.2 cm).

Using a strain-shearing stress measurement device (RPA2000, available from Alpha Technologies), the strain shear modulus G' at a strain of 0.28% and the strain shear modulus G' at a strain of 30.0% of the vulcanized rubber sheet manufactured were measured, and the difference G' 0.28 (MPa)–G' 30.0 (MPa) was calculated as the Payne effect.

The results were recorded in Table 1. The results were expressed as index values with the value for Comparative Example 1 being taken as 100. A smaller index value indicates a higher dispersibility of the reinforcing filler.

Workability

The Mooney viscosity ($ML_{1+4}$) at 100° C. of each rubber composition (unvulcanized) obtained was measured in accordance with JIS K6300-1:2013.

The results were recorded in Table 1. The results were expressed as index values with the value for Comparative Example 1 being taken as 100. A smaller index value indicates a lower viscosity and a higher workability.

Elongation at Break

Regarding each vulcanized rubber sheet manufactured as described above, a dumbbell-shaped JIS No. 3 test piece (thickness: 2 mm) was punched out, and the elongation at break was evaluated under the condition of a temperature of 20° C. and a tensile test speed of 500 mm/min, in accordance with JIS K6251:2010.

The results were recorded in Table 1. The results are expressed as index values with the elongation at break of Comparative Example 1 being assigned the index value of 100. A larger index value indicates a higher toughness.

Low Heat Build-Up

The loss tangent at a temperature of 60° C., tan δ (60° C.), was measured for each vulcanized rubber sheet manufactured as described above using a viscoelastic spectrometer (available from Toyo Seiki Seisaku-sho, Ltd.) under the following conditions: 10% initial strain, ±2% amplitude, and 20 Hz frequency.

The results were recorded in Table 1. The results were expressed as index values with the value for Comparative Example 1 being taken as 100. A smaller index value indicates a lower heat build-up.

Wear Resistance

For each vulcanized rubber sheet manufactured as described above, amount of wear was measured in accordance with JIS K6264-1, 2:2005 using a Lambourn abrasion test machine (available from Iwamoto Seisakusho Co. Ltd.) at a temperature of 20° C. and at a slip ratio of 50%. The wear resistance index values were calculated from the following equation.

The results were recorded in Table 1. A larger index value indicates a smaller amount of wear and a higher wear resistance.

Wear resistance index value=(amount of wear of Comparative Example 1/amount of wear of each vulcanized rubber sheet)×100

TABLE 1

|  | Comparative Example 1 | Comparative Example 2 | Comparative Example 3 | Comparative Example 4 | Comparative Example 5 | Example 1 | Example 2 | Example 3 | Example 4 | Example 5 | Example 6 |
|---|---|---|---|---|---|---|---|---|---|---|---|
| SBR | 100 (80) | 100 (80) | 100 (80) | 100 (80) | 100 (80) | 100 (80) | 100 (80) | 100 (80) | 100 (80) | 100 (80) | 100 (80) |
| BR | 20 | 20 | 20 | 20 | 20 | 20 | 20 | 20 | 20 | 20 | 20 |
| Carbon black | 5 | 5 | 5 | 5 | 5 | 5 | 5 | 5 | 5 | 5 | 5 |
| Silica | 70 | 70 | 70 | 70 | 70 | 70 | 70 | 70 | 70 | 70 | 70 |
| Silane coupling agent | 5 | 5 | 5 | 5 | 5 | 5 | 5 | 5 | 5 | 5 | 5 |
| Unmodified BR 1 | 5 |  |  |  |  |  |  |  |  |  |  |
| Unmodified BR 2 |  | 5 |  |  |  |  |  |  |  |  |  |
| Comparative Modified BR 1 |  |  | 5 |  |  |  |  |  |  |  |  |
| Comparative Modified BR 2 |  |  |  | 5 |  |  |  |  |  |  |  |
| Specific Modified BR 1 |  |  |  |  | 5 |  |  |  |  |  |  |
| Specific Modified BR 2 |  |  |  |  |  | 5 |  |  |  | 1 | 10 |
| Specific Modified BR 3 |  |  |  |  |  |  | 5 |  |  |  |  |
| Specific Modified BR 4 |  |  |  |  |  |  |  | 5 |  |  |  |
| Stearic acid | 2 | 2 | 2 | 2 | 2 | 2 | 2 | 2 | 2 | 2 | 2 |
| Processing Aid | 1 | 1 | 1 | 1 | 1 | 1 | 1 | 1 | 1 | 1 | 1 |
| Anti-aging agent | 2 | 2 | 2 | 2 | 2 | 2 | 2 | 2 | 2 | 2 | 2 |
| Oil | 15 | 15 | 15 | 15 | 15 | 15 | 15 | 15 | 15 | 15 | 15 |
| Zinc oxide | 2 | 2 | 2 | 2 | 2 | 2 | 2 | 2 | 2 | 2 | 2 |
| Sulfur | 1.5 | 1.5 | 1.5 | 1.5 | 1.5 | 1.5 | 1.5 | 1.5 | 1.5 | 1.5 | 1.5 |
| Vulcanization Accelerator CZ | 2 | 2 | 2 | 2 | 2 | 2 | 2 | 2 | 2 | 2 | 2 |
| Vulcanization Accelerator DPG | 0.5 | 0.5 | 0.5 | 0.5 | 0.5 | 0.5 | 0.5 | 0.5 | 0.5 | 0.5 | 0.5 |
| Tg (° C.) of Rubber Component | −43 | −43 | −43 | −43 | −43 | −43 | −43 | −43 | −43 | −43 | −43 |
| Dispersibility | 100 | 96 | 94 | 101 | 102 | 79 | 75 | 78 | 89 | 88 | 70 |
| Workability | 100 | 94 | 95 | 98 | 96 | 96 | 97 | 98 | 99 | 99 | 95 |
| Elongation at Break | 100 | 101 | 96 | 92 | 102 | 109 | 105 | 106 | 102 | 101 | 104 |
| Low heat build-up | 100 | 106 | 103 | 98 | 95 | 93 | 92 | 94 | 96 | 97 | 89 |
| Wear Resistance | 100 | 100 | 101 | 98 | 102 | 105 | 106 | 104 | 105 | 102 | 101 |

The details of each component shown in Table 1 above are as follows.

SBR: Tufdene F3420 (SBR, Mw=over 15000, styrene unit content=36 mass %, Tg=−27° C., oil extended product containing 25 parts by mass of oil per 100 parts by mass of rubber component; available from Asahi Kasei Chemicals Corporation)

BR: Nipol BR 1220 (BR, Mw=490000, Tg=−105° C., available from ZEON CORPORATION)

Carbon black: SEAST KH (available from Tokai Carbon Co., Ltd.)

Silica: Zeosil Premium 200MP (silica, $N_2SA$=200 m$^2$/g, CTAB=200 m$^2$/g, $N_2SA$/CTAB=1.0, available from Rhodia)

Silane coupling agent: Si69 (available from Evonic Degussa Corporation)

Unmodified BR1: LBR-302 (unmodified BR, Mw=5500, Mw/Mn=1.1, Tg=−85° C., viscosity=1199 mPa·s, available from Kuraray Co., Ltd.)

Unmodified BR2: LBR-307 (unmodified BR, Mw=8000, Mw/Mn=1.1, Tg=−95° C., viscosity: =2350 mPa·s, available from Kuraray Co., Ltd.)

Comparative modified BR1: Comparative modified BR1 (modified BR having a functional group, represented by Formula (m1) above, at a terminal, Mw=19200, Mw/Mn=1.1, vinyl/trans/cis=21/33/46, Tg=−70° C., and viscosity=7584 mPa·s) synthesized as described above Comparative modified BR2: Comparative modified BR2 (modified BR having a functional group, represented by Formula (m1) above, at a terminal, Mw=8800, Mw/Mn=2.2, vinyl/trans/cis=23/38/39, Tg=−77° C., and viscosity=2157 mPa·s) synthesized as described above Specific modified BR1: Specific modified BR1 (modified BR having a functional group, represented by Formula (m1) above, at a terminal, Mw=4400, Mw/Mn=1.1, vinyl/trans/cis=31/45/24, Tg=−83° C., and viscosity=2350 mPa·s) synthesized as described above Specific modified BR2: Specific modified BR2 (modified BR having a functional group, represented by Formula (m1) above, at a terminal, Mw=8100, Mw/Mn=1.1, vinyl/trans/cis=24/40/36, Tg=−80° C., and viscosity=4794 mPa·s) synthesized as described above Specific modified BR3: Specific modified BR3 (modified BR having a functional group, represented by Formula (m1) above, at a terminal, Mw=9400, Mw/Mn=1.5, vinyl/trans/cis=24/38/38, Tg=−76° C., and viscosity=4251 mPa·s) synthesized as described above Specific modified BR4: Specific modified BR4 (modified BR having a functional group, represented by Formula (m1) above, at a terminal, Mw=9500, Mw/Mn=1.2, vinyl/trans/cis=26/45/29, Tg=−82° C., and viscosity=4876 mPa·s) synthesized as described above Stearic acid: Stearic acid YR (available from NOF Corporation)

Processing aid: Aktiplast ST (available from Rhein Chemie)

Anti-aging agent: SANTOFLEX 6PPD (available from Soltia Europe)

Oil: Extract No. 4S (available from Showa Shell Sekiyu K.K.)

Zinc oxide: Zinc Oxide III (available from Seido Chemical Industry Co., Ltd.)

Sulfur: oil treatment sulfur (available from Karuizawa Refinery Ltd.)

Vulcanization accelerator CZ: NOCCELER CZ-G (available from Ouchi Shinko Chemical Industrial Co., Ltd.)

Vulcanization accelerator DPG: Soxinol D-G (available from Sumitomo Chemical Co., Ltd.)

Note that in Table 1, "Tg of rubber component" refers to "Tg of rubber component" as described above.

As can be seen from Table 1, Examples 1 to 6 in which the specific modified BR was compounded exhibited excellent dispersibility, workability, toughness, low heat build-up, and wear resistance compared to Comparative Example 1 which did not contain the specific modified BR.

By contrast, in Comparative Examples 2 and 3 in which a butadiene polymer without the specific functional group at a terminal thereof was compounded, Comparative Example 4 in which a modified BR having the specific functional group at a terminal but a Mw greater than 15000 was compounded, and Comparative Example 5 in which a modified BR having the specific functional group at a terminal but a Mw/Mn greater than 2.0 was compounded, the dispersibility was insufficient.

As can be seen by comparing Examples 1 to 4, Comparative Example 4, and Comparative Example 5, the dispersibility was greatly improved by making the Mw of the modified BR at least 1000 and at most 15000 and the Mw/Mn 2.0 or less. That is, a significant criticality was found between the size (Mw, Mw/Mn) of the modified BR and the dispersibility of the reinforcing filler.

By comparing Examples 1 to 4 (comparison of the same aspects in which the content of the specific modified BR was 6.7 mass % with respect to the content of the reinforcing filler), the specific modified BR in Examples 1 to 3, in which the terminals were modified with a cyclic silazane, exhibited better dispersibility, workability, toughness, and low heat build-up. It is presumed that the specific modified BR in which the terminals are modified with a cyclic silazane has a high degree of modification. Among these, Examples 1 and 2, in which the Mw/Mn of the specific modified BR was 1.3 or less, exhibited better workability, low heat build-up, and wear resistance. Of these, Example 2, in which the Mw of the specific modified BR was 5000 or greater, exhibited better dispersibility, workability, low heat build-up, and wear resistance.

By comparing Examples 2, 5, and 6 (comparison of the same aspects in which the specific modified BR2 was used as the specific modified BR), Example 2, in which the content of the specific modified BR was 2.0 to 10.0 mass % with respect to the content of the reinforcing filler, exhibited excellent balance at an extremely high level among dispersibility, workability, toughness, low heat build-up, and wear resistance.

The invention claimed is:

1. A modified butadiene polymer comprising a functional group containing a nitrogen atom and a silicon atom at a terminal, the nitrogen atom being included as an amino group, the modified butadiene polymer having a weight average molecular weight of from 1000 to 9500, and a molecular weight distribution of 2.0 or less, wherein a proportion of vinyl structure contained in the modified butadiene polymer is from 24 to 50 mol %.

2. The modified butadiene polymer according to claim 1, wherein a viscosity is from 150 to 240% relative to a viscosity of a butadiene polymer prior to modification, wherein the viscosity is measured with a cone-plate viscometer.

3. A rubber composition comprising a rubber component having a weight average molecular weight greater than 15000, a reinforcing filler, and the modified butadiene polymer described in claim 1, wherein a content of the reinforcing filler is from 50 to 200 parts by mass per 100 parts by mass of the rubber component, and a content of the modified butadiene polymer is from 1 to 25 mass % with respect to the content of the reinforcing filler.

4. A rubber composition comprising a rubber component having a weight average molecular weight greater than 15000, a reinforcing filler containing at least one selected from the group consisting of carbon black and silica, and the modified butadiene polymer described in claim 1.

5. The rubber composition according to claim 3, wherein the reinforcing filler contains at least one selected from the group consisting of carbon black and silica, and the silica has a nitrogen adsorption specific surface area of 194 $m^2/g$ or greater, a CTAB adsorption specific surface area of 185 $m^2/g$ or greater, and a ratio of the nitrogen adsorption specific surface area to the CTAB adsorption specific surface area is from 0.9 to 1.4.

6. The rubber composition according to claim 4, comprising silica as the reinforcing filler and further comprising a silane coupling agent, wherein a content of the silane coupling agent is from 1 to 20 mass % with respect to the content of the silica.

7. The rubber composition according to claim 3, wherein a glass transition temperature of the rubber component is −60° C. or higher.

8. A rubber composition comprising a rubber component having a weight average molecular weight greater than 15000, a reinforcing filler, and the modified butadiene polymer described in claim 2, wherein a content of the reinforcing filler is from 50 to 200 parts by mass per 100 parts by mass of the rubber component, and a content of the modified butadiene polymer is from 1 to 25 mass % with respect to the content of the reinforcing filler.

9. A rubber composition comprising a rubber component having a weight average molecular weight greater than 15000, a reinforcing filler containing at least one selected from the group consisting of carbon black and silica, and the modified butadiene polymer described in claim 2.

10. The rubber composition according to claim 4, wherein the reinforcing filler contains silica, and the silica has a nitrogen adsorption specific surface area of 194 $m^2/g$ or greater, a CTAB adsorption specific surface area of 185 $m^2/g$ or greater, and a ratio of the nitrogen adsorption specific surface area to the CTAB adsorption specific surface area is from 0.9 to 1.4.

11. The rubber composition according to claim 8, wherein the reinforcing filler contains at least one selected from the group consisting of carbon black and silica, and the silica has a nitrogen adsorption specific surface area of 194 $m^2/g$ or greater, a CTAB adsorption specific surface area of 185 $m^2/g$ or greater, and a ratio of the nitrogen adsorption specific surface area to the CTAB adsorption specific surface area is from 0.9 to 1.4.

12. The rubber composition according to claim 9, wherein the reinforcing filler contains silica, and the silica has a nitrogen adsorption specific surface area of 194 $m^2/g$ or greater, a CTAB adsorption specific surface area of 185 $m^2/g$ or greater, and a ratio of the nitrogen adsorption specific surface area to the CTAB adsorption specific surface area is from 0.9 to 1.4.

* * * * *